(12) United States Patent
Davis et al.

(10) Patent No.: US 7,931,839 B2
(45) Date of Patent: *Apr. 26, 2011

(54) METHOD OF MANUFACTURING COMPOSITE SINGLE-TUBED STRUCTURES HAVING PORTS

(75) Inventors: Stephen J. Davis, Newtown, PA (US); Mauro Pezzato, Treviso (IT); Mauro Pinaffo, Camposampiero (IT); Roberto Gazzara, Mestre (IT); Michele Pozzobon, Fossalunga di Vedelago (IT)

(73) Assignee: Prince Sports, Inc., Bordentown, NJ (US)

( * ) Notice: Subject to any disclaimer, the term of this patent is extended or adjusted under 35 U.S.C. 154(b) by 223 days.

This patent is subject to a terminal disclaimer.

(21) Appl. No.: 12/106,579

(22) Filed: Apr. 21, 2008

(65) Prior Publication Data

US 2008/0197543 A1 Aug. 21, 2008

Related U.S. Application Data

(63) Continuation-in-part of application No. 11/584,198, filed on Oct. 20, 2006.

(30) Foreign Application Priority Data

May 29, 2006 (EP) .................................. 06114815

(51) Int. Cl.
B29C 65/02 (2006.01)
(52) U.S. Cl. ........ 264/154; 264/156; 264/248; 264/263; 264/313
(58) Field of Classification Search ........................ None
See application file for complete search history.

(56) References Cited

U.S. PATENT DOCUMENTS 6,589,125 B1 * 7/2003 Tsai .............................. 473/539
7,811,500 B2 * 10/2010 Gazzara et al. ............... 264/314
2005/0153799 A1 7/2005 Rigoli

* cited by examiner

*Primary Examiner* — Edmund H. Lee
(74) *Attorney, Agent, or Firm* — Abelman, Frayne & Schwab

(57) ABSTRACT

A method of manufacturing a structure using a single, hollow primary tube, preferably of a composite material, wherein ports are bonded to the walls of the hollow tube through aligned holes on opposite sides of the hollow tube. The ports improve the stiffness, strength, aerodynamics, and aesthetics of the structure.

16 Claims, 4 Drawing Sheets

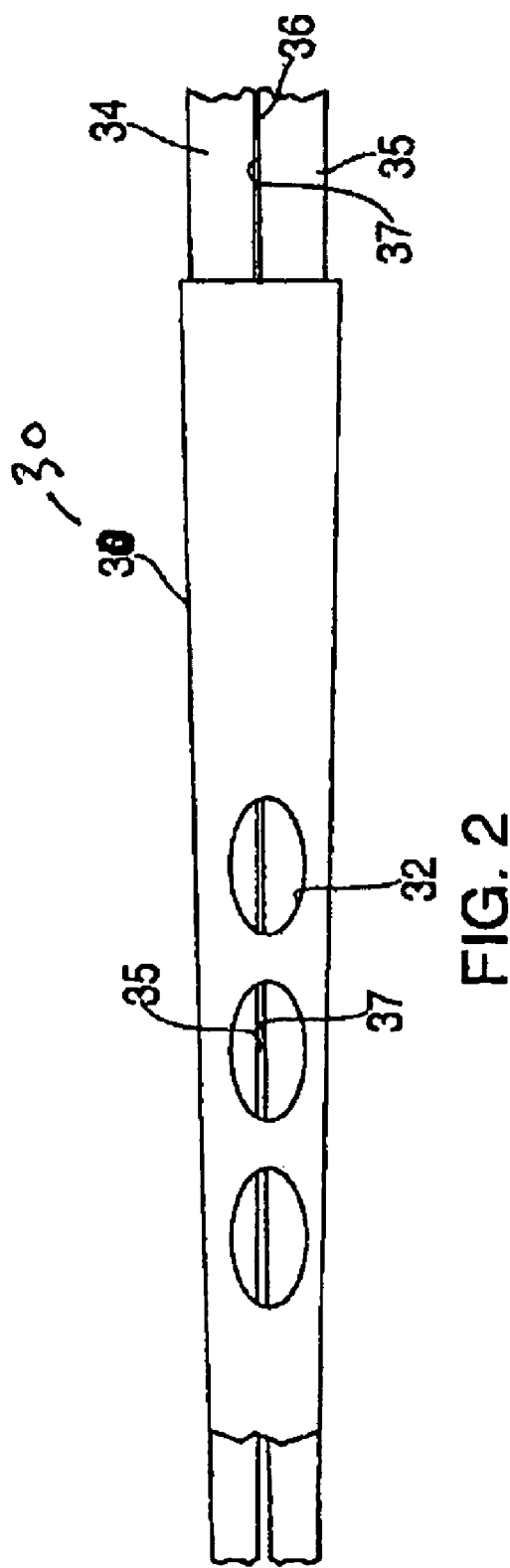
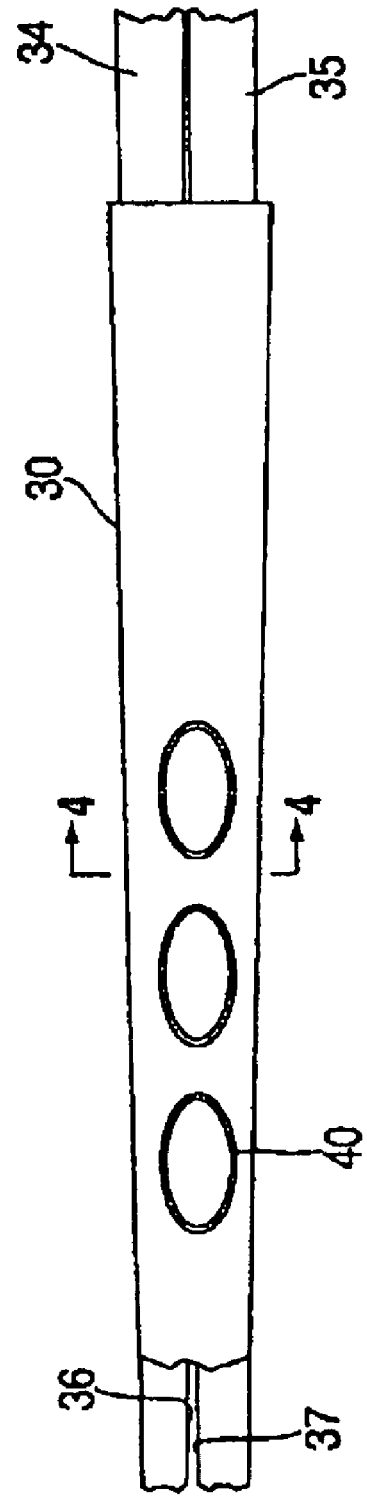
FIG. 2
FIG. 3

METHOD OF MANUFACTURING COMPOSITE SINGLE-TUBED STRUCTURES HAVING PORTS

RELATED APPLICATIONS

This application claims the benefit under 35 U.S.C. §120 of U.S. patent application Ser. No. 11/584,198, filed Oct. 20, 2006, now U.S. Pat. No. 7,727,095 entitled "Hockey Stick Having A Single, Hollow Primary Tube, which claims the benefit under 35 U.S.C. §119 of EPO application EP 06114815.1, filed May 29, 2006.

FIELD OF THE INVENTION

The present invention relates to a method of manufacturing a composite structure for a generic product, and more particularly, where the structure is generally tubular and constructed from a single, hollow tube having at least one, and preferably a series, of ports that extend through the hollow tube. The ports provide specific performance advantages, which may include strength, stiffness, comfort, aerodynamic and aesthetic benefits.

The generic structure thus formed can be any structure having a performance related to weight, balance, strength, stiffness, vibration, aerodynamics, or other performance characteristics. The structure can be solid or hollow, straight or curved. The structure can be used, for example, in sporting goods, tools, automobiles, aerospace, furniture and many other applications.

BACKGROUND OF THE INVENTION

There are numerous examples of existing structures being replaced by lighter weight materials. For example, fiber reinforced resins, also known as composite materials, have replaced wood structures in sporting good applications such as golf clubs, tennis racquets, hockey sticks and baseball bats. Composite materials have also been used to replace metal in similar applications such as golf clubs, tennis racquets, skis, and bicycle frames.

Preferably, the lightest materials and designs are used to achieve the performance goals of the particular structure. The most popular high performance material for modern structure design is carbon fiber reinforced epoxy resin (CFE) because it has the highest strength and stiffness to weight ratio of any realistically affordable material. As a result, CFE can produce a very light weight structure with excellent strength as well as providing a variation of stiffness at various regions along the surface or length of the structure.

However, there are limitations on carbon fiber based materials used for structures when considering strength requirements. For example, a tubular structure made from a carbon fiber composite can be susceptible to catastrophic failure resulting from excessive compressive forces, which can cause buckling of the thin walled tubes. The tubular structure may also be subjected to a multitude of stress conditions, for example, transverse impact loads, torsional loads or vibrational loads. A thin walled tube made of a fiber reinforced composite may not have the strength to withstand various loading condition scenarios.

Also, in the prior art, if holes were required in a hollow structure, for example, to reduce weight or for fastening means or for aerodynamics, the holes would be formed by removing material by cutting or drilling holes in the walls of the structure. This weakens the structure considerably when reinforcing fibers are severed during the cutting of the holes.

Thus, there exists a continuing need for an improved structure that has the combined features of light weight, improved bending, improved stiffness, improved vibration damping, improved aerodynamics, and improved aesthetics.

SUMMARY OF THE INVENTION

The present invention is a structure where at least a portion of the structure is formed of a single, hollow tube having at least one, and preferably a series, of ports that extend through the hollow tube. The ports provide specific performance advantages. Each port has a peripheral wall that extends between opposed, aligned holes in the hollow tube to form the port. The opposite ends of the peripheral wall are bonded to the walls of the tube. The peripheral wall forming the port, which extends between opposite sides of the tube, is preferably elliptically-shaped to form opposing arches, which provide strength, stiffness, comfort, and aesthetic benefits. The ports also provide an aerodynamic advantage because they allow air to pass through the ports, which reduces the aerodynamic drag of the structure.

The present invention applies preferably to composite structures, but will apply to tubular structures of all materials. For the composite structure, the holes to accommodate the ports may be formed in the primary tube prior to molding by punching or other suitable means. Although carbon fibers may be cut in the process, the primary tube retains strength due to the fact that, after molding, the tubular insert members which form the peripheral walls of the ports, are bonded to the hole edges and extend across the primary tube. Alternatively, the holes may be formed by separating fibers in the wall of the structure, in which case fibers will not be cut.

The present invention is designed to provide a combination of tailored stiffness, improved strength, light weight, improved aerodynamics, and improved aesthetics over current prior art structures.

The present invention provides a new and improved structure of durable and reliable construction which may be easily and efficiently manufactured at low cost with regard to both materials and labor. This provides improved aerodynamics, improved strength, improved fatigue resistance, and provides a unique look and improved aesthetics. The invention also allows for specific stiffness zones at various orientations and locations along the length of the structure.

For a better understanding of the invention and its advantages, reference should be made to the accompanying drawings and descriptive matter in which there are illustrated preferred embodiments of the invention.

BRIEF DESCRIPTION OF THE DRAWINGS

FIG. 2 is a front view of a portion of the structure of FIG. 1 showing the bladders in place.

FIG. 3 is a front view of a portion of the structure during a subsequent step in the manufacturing process showing the tubes forming the peripheral walls of the ports in place.

DETAILED DESCRIPTION OF THE INVENTION

Figure 1:
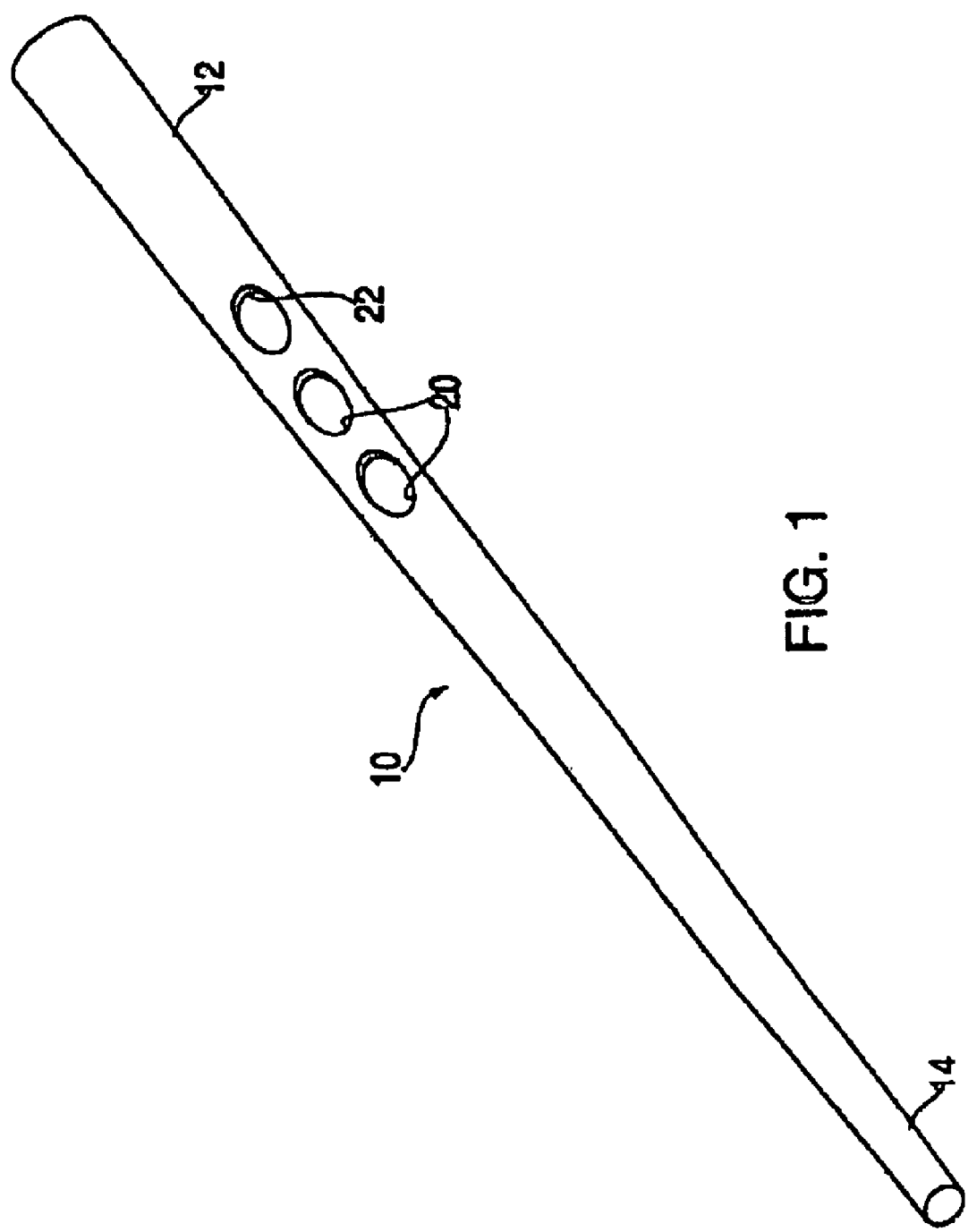
FIG. 1 is an isometric view of a structure constructed in accordance with an embodiment of the present invention.

With reference to FIG. 1 of the drawings, the present invention is a composite structure 10, featuring one or more ports 20 formed into the walls of the structure for improving the flexibility, strength and other characteristics of the structure. Structure 10 is preferably fabricated of multiple layers of aligned carbon filaments held together with an epoxy binder. The fibers in the various plies are preferably parallel to one another, but the various plies may have varying fiber orientations. Structure 10 has a generally hollow configuration.

A plurality of ports 20 are formed in structure 10. Ports 20 extend between opposed, aligned holes defined in the structure, as described in more detail below. Each port may be of any shape, but is preferably oval in shape, with the long axis of the oval aligned with the longitudinal axis of structure 10. Each port 20 includes a peripheral wall 22 (see FIGS. 6-7) that extends, in one embodiment, between opposite faces of the structure. The opposing ends of peripheral wall 22 are bonded to tubular structure 10.

The ports are preferably in the shape of opposing arches which allow the structure to deflect, which deforms the ports, and allows them to return with more resiliency. The ports also allow greater bending flexibility and strength than would traditionally be achieved in a single tube design because internal columns formed by the peripheral walls of the ports help prevent buckling failures of the thin walled tubular structure. If the longitudinal axes of the ports are in line with the direction of travel of the structure, they can also provide an aerodynamic advantage, allowing air to pass through the structure, resulting in higher velocities. Finally, the ports provide the structure with a unique appearance.

The structure is preferably made from a fiber reinforced composite material. Traditional lightweight composite structures have been made by preparing an intermediate material, known as "prepreg", which will be used to mold the final structure. Prepreg is formed by embedding fibers for, for example, carbon, fiberglass, aramid, boron, liquid crystal polymer, hemp and others, in resin. This is typically done using a prepreg machine, which applies the non-cured resin over the fibers so they are wetted out. The resin is at "B Stage" meaning that only heat and pressure are required to complete the cross linking and to harden and cure the resin. Thermoset resins, like epoxy, are popular because they are available in liquid form at room temperature, which facilitates the embedding process.

A thermoset is created by a chemical reaction of two components, forming a material in a nonreversible process. Usually, the two components are available in liquid form, and after mixing together, will remain as a liquid for a period of time before the cross-linking process begins. It is during this "B Stage" that the prepreg process happens, where the resin coats the fibers. Common thermoset materials are epoxy, polyester, vinyl, phenolic, polyimide, and others. Thermoplastic resins may also be used such as nylon, ABS, PBT and others.

The prepreg sheets are cut and stacked according to a specific sequence, with particular attention given to the fiber orientation of each ply. Each prepreg layer comprises an epoxy resin combined with unidirectional parallel fibers of the type previously mentioned. The prepreg is cut into strips at various angles and laid on a table. The strips are then stacked in an alternating fashion such that the fibers of each layer are oriented differently from the adjacent layers. For example, one layer may be +45 degrees, the next layer −45 degrees. If more bending stiffness is desired, a fiber angle such as zero degrees is used. If more torsional stiffness is desired, a higher proportion of +/−45 degree strips are used. If more bending stiffness is desired, a higher proportion of 0 degree fibers are used. Other fiber angles may also be used. Additionally, the stiffness may be varied in different places along the length of the structure using the method just discussed.

This lay-up, which comprises various strips of prepreg material, is then rolled over an internal mandrel in the shape of a tube. Referring to FIG. 2, according to the preferred embodiment of the invention, a suitable uncured prepreg tube 30 is formed in the manner just described, with the various composite plies oriented at the desired angles. The internal mandrel is removed following the formation of the prepreg tube.

Although the described method of forming the tubes is the preferred method, other methods could also be used, such as utilizing a wet lay-up, where fibers are impregnated with resin by hand and then rolled up or by resin transfer molding, wherein dry fibers are packed into a mold, the mold is closed, and resin is pumped or drawn by vacuum into the mold to impregnate the fibers.

Next, a one or more pairs of holes 32 are formed through opposing sides of the wall of the tube, perpendicular to the longitudinal axis of the tube. Holes 32 may be stamped through the walls, or, preferably, a tool is used to separate the carbon fibers from one another, without cutting the fibers, to form holes 32. Holes 32, at this stage, need not have the final desired shape.

The tube requires internal support or pressure to force the prepreg material against the surface of the mold. Therefore, an internal support element is necessary. In the preferred method, a inflatable bladders are used for this purpose. A pair of inflatable bladders 34, 35, preferably made of nylon, is inserted through tube 30 such that their facing walls 36, 37 are aligned with holes 32, as shown in FIG. 2. As discussed below, other types of internal support elements may also be used.

Figure 4:
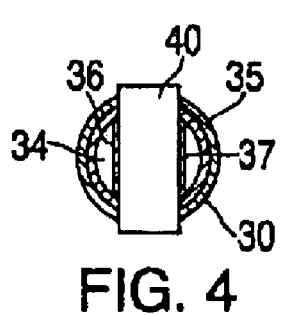
FIG. 4 is a cross-sectional view of the prepreg tube of FIG. 3, taken through lines 4-4.
Figure 5:
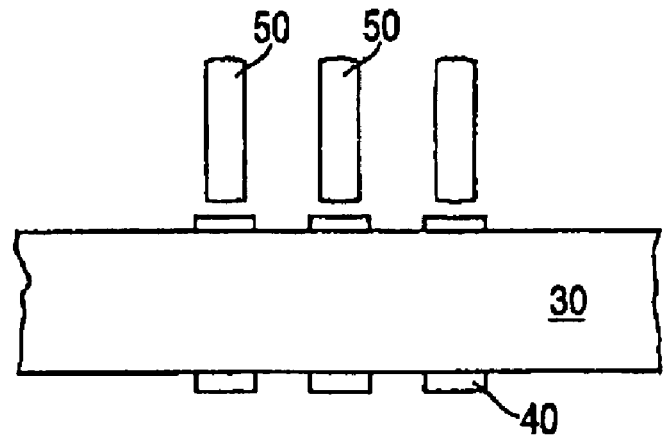
FIG. 5 is a side view of the prepreg tube of the prepreg tube of FIG. 3 during a subsequent manufacturing step in showing the mold pins being inserted into the ports.

As shown in FIGS. 3-5, after bladders 34, 35 have been inserted, a hollow, tubular plug 40 is inserted through each of the holes 32, between the facing walls 36, 37 of bladders 34, 35. Thus, as shown in FIG. 4, plugs 40 separate the two bladders at the points where they are inserted, but otherwise allow the facing walls 36, 37 of bladders 34, 35 to contact each other. Plugs 40 will form the peripheral walls of ports 20.

Plugs 40 are preferably tubes composed of prepreg material. However, if desired, plugs 40 may be made of other materials such as metal or plastic. If plugs 40 are composed of prepreg material, the ends of plugs 40 will preferably extend beyond the outer surfaces of the prepreg tube 30, as shown in FIGS. 4-5.

Finally, as shown in FIG. 5, if plugs 40 are formed of prepreg material, a mold pin 50 is inserted through each plug 40 to form the internal geometry of ports 20 and to prevent plugs 40 from deforming during the curing process. This may occur prior to mold packing, or during the mold packing process.

Tube 30 is then packed into a mold (not shown) which forms the shape of the outer surface of the structure. If the mold and tube are longer than the final desired dimension of the structure, a final cut to length operation can be performed on structure 10 after molding.

Air fittings are then attached to bladders 34, 35. The mold is then closed over tube 30 and placed in a heated platen press. For epoxy resins, the temperature is typically around 350° F.

While the mold is being heated, tube 30 is internally pressurized by inflating bladders 34, 35, which compresses the prepreg material and forces tube 30 to assume the shape of the mold. At the same time, the heat cures the epoxy resin. The bladders also compress peripheral walls 22 of plugs 40, so that the inwardly facing surface of each plug 40 conforms to the shape of mold pin 50 (which, in the preferred embodiment, is oval). At the same time, the heat and pressure cause the ends of plugs 40 to bond to the wall of prepreg tube 30.

Once cured, the mold is opened in the reverse sequence of packing. Mold pins 50 are typically removed first, followed by the top portion of the mold. Particular attention is needed if removing the top portion with mold pins 50 intact to ensure that this is done in a linear fashion. Once mold pins 50 have been removed from structure 10, structure 10 can be removed from the bottom portion of the mold.

Figure 6:
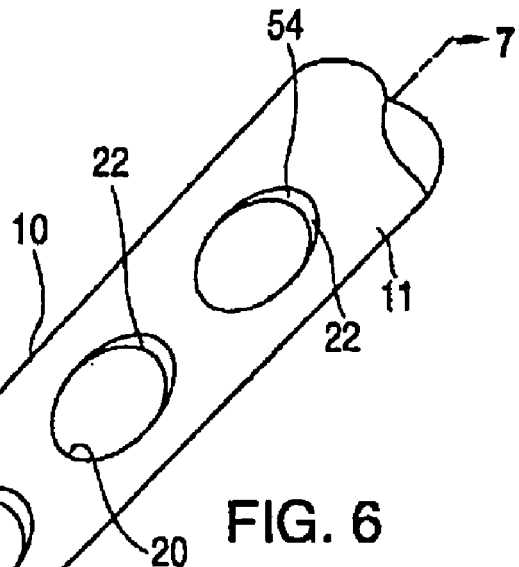
FIG. 6 is an isometric view of a portion of the structure after molding.
Figure 7:
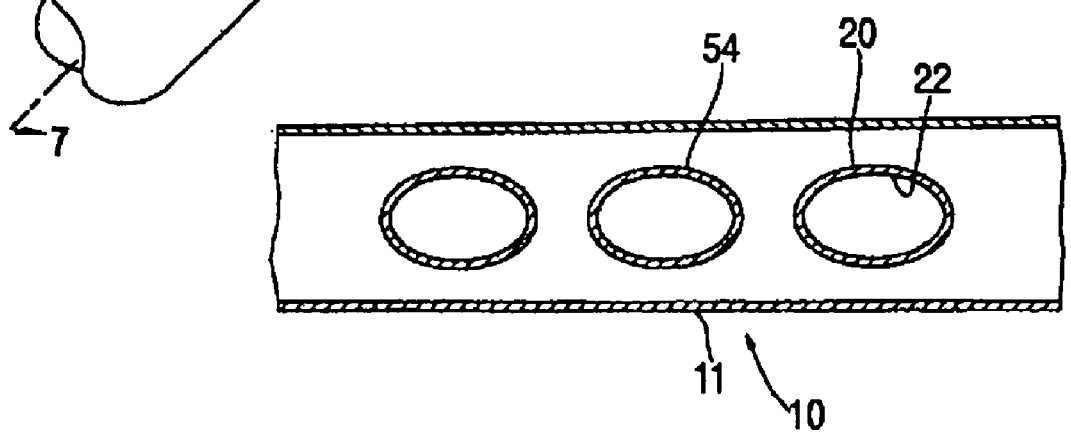
FIG. 7 is a longitudinal sectional view, taken through lines 7-7 of FIG. 6.

As shown in FIGS. 6-7, after molding, structure 10 is formed of a primary, hollow, cured tube 11, with a plurality of ports 20 extending through tube 11. The ends of port walls 54 are bonded to the portions of tube 11 surrounding ports 20, and the inwardly facing surfaces 22 of ports 20 extend completely through tube 11.

In an alternate embodiment of the invention, ports 20 may be orientated in different directions. For example, alternative ports 20 may have their longitudinal axes oriented at 90 degrees with respect to each other. Any such arrangement of ports is contemplated to be with the scope of this invention. In such embodiments the manufacturing process is somewhat more complicated and may require the use of multiple bladders instead of two bladders. For example, if it is desired that the ports be oriented at 90 degrees with respect to each other, four bladders will be required, with the interface of the bladders forming a cross shape, where one leg of the cross supports tubular inserts 40 in one direction and the other leg of the cross supports tubular inserts 40 in the orthogonal direction. This embodiment will have the advantage of providing the strength improvements regardless of how the structure is swung or used. In addition, it is understood that the size, shape and placement of the holes can vary depending upon the desired performance of the structure. Likewise, more complicated arrangements using any number of tubes may be used.

The above mentioned process describes using internal bladder pressurization for the entire length of the structure as the internal support element. Other materials may also be used for this purpose. An alternative to using internal air pressure is the use of an expanding internal foam core that expands when heated. Another option is a liquid contained in the nylon bladder that turns into a gas when heated to generate internal pressure.

The structure may also be formed by applying external pressure using a rigid material as the core to resist the external pressure. This process is commonly called compression molding, where the pre-form is placed in the mold cavity, and the mold is closed over the perform compressing it. The internal core resists this externally applied pressure and consolidates the prepreg plies in between. Several options exist for the core material, but are not limited to the following examples. A rigid light weight foam can be used which will likely be contained in the part and not removed. If a hollow part is desired, a core made of rigid salt compound can be used and then after molding, the salt can be dissolved using water to create a hollow structure. Another option is to use glass beads contained inside a polymeric bladder to resist the external pressure and following molding, the glass beads can be evacuated from the structure.

In an alternative embodiment, it may be desirable to first mold a traditional portion of the structure without ports, then place this structure in another mold where the bladder molded portion forming the ports would be fused to it.

Figure 8A:
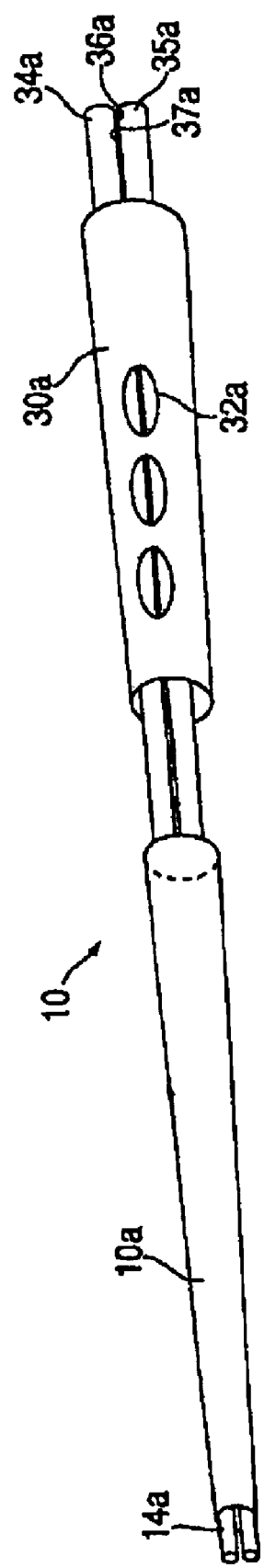
FIGS. 8a and 8b illustrate an alternative production method.
Figure 8B:
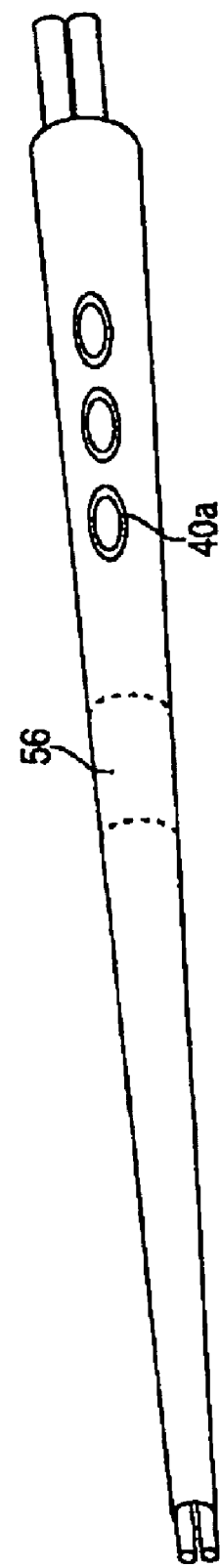

This alternative process is illustrated in FIGS. 8a-8b. A pre-formed portion 10a has been previously formed by bladder molding or compression molding, or, alternatively, may be composed of an alternate material and has been formed using a process particular to that material. Bladders 34a, 35a may extend through pre-formed portion 10a, if possible, but may also extend only through prepreg portion 30a.

Pre-formed portion 10a is connected to the prepreg portion 30a by means of an overlap joint 56. This is to ensure a strong interface between the two portions. Other joining means may be considered. While the mold is being heated, prepreg tube 30a is internally pressurized, which compresses the prepreg material and forces tube 30a to assume the shape of the mold as well as to bond to pre-formed portion 10a.

In yet another embodiment of the invention, the body of the structure may not necessarily be circular in cross sectional shape but, instead, may be elliptical or any other desired shape, including shapes having straight edges and non-symmetrical shapes, such as polygons and teardrops. The cross-sectional shape of structure is determined by the size and shape of the mold which is used to form the outside surface of structure and by the shape of the bladders used to inflate the structure from within.

In yet another embodiment, ports may be grouped in groups running along the lengths of the structure and need not appear as a sequential grouping all in one portion of the structure. Any desired spacing and orientation of the ports is contemplated to eb within the scope of the invention.

The size and spacing of the ports can affect structure stiffness in a desirable way. The ports can direct the flex point of the structure toward a particular region of the structure, if desired. An additional benefit of the ports in the structure is that they improve the durability and strength of the structure. This is because they act as arches to distribute the stress placed on the structure during flexing in a very efficient manner. In addition, the cylindrical internal reinforcements formed by the walls of the ports resist compressive loads, which tend to buckle the thin walls of the tube.

In some embodiments, it may be desirable that the structure have uniform longitudinal or torsional stiffness. In such cases it may be possible to make the structure more stiff at various localized places to compensate for a lack of stiffness that may be caused by a variety of factors. The structure can be made more stiff by adding one or more ridges on the external surface of the structure. For example, the placement of the ports in the structure will tend to decrease the structure stiffness in the areas defining the ports. The stiffness in these areas can be increased by defining ridges in the vicinity of the ports. Such ridges can be longitudinally or circumferentially disposed, and can be of limited length or can run the entire length of the structure. Additionally, the cross-sectional shape of the structure can also affect stiffness, particularly when such cross-sectional shapes define corners, such as with a polygonal or teardrop cross sectional shape. Note that if uniform stiffness is not desired, ridges may be added to increase the stiffness in some areas, while leaving other areas unaltered. Absent any ridges, the stiffness of the structure will be defined by the manner and angle at which the prepreg strips were laid out to form the basic hollow structure, as previously discussed.

In another alternative embodiment, it is also possible to use a metal material for the main structure such as aluminum or steel, and bond composite, metal or plastic cylindrical ports to the aluminum in a similar manner.

With respect to the above description, it is to be realized that the optimum dimensional relationships for the parts of the invention, to include variations in size, materials, shape, form, function and manner of operation, assembly and use, are intended to be with the scope of the invention. Further, it is not desired to limit the invention to the exact construction and operation shown and described, and accordingly, all suitable modifications and equivalents may be resorted to, falling within the scope of the invention.

We claim:

1. A method of forming a structure comprising the steps of:
   a. providing a single hollow tube of an uncured composite material having an interior and a pair of opposed wall sections;
   b. forming an opening through each said opposed wall section;
   c. inserting an internal support element within the interior of said hollow tube for use in shaping the tube during molding, wherein said internal support element is selected from a group consisting of an inflatable bladder system, a rigid light weight foam, a rigid salt compound which can be dissolved by water, glass beads, and bladders containing a liquid that changes to a gas under the heat of the molding process;
   d. inserting a hollow, tubular plug through the pair of opposed openings such that said plug has a first portion disposed in one of said openings, a second portion disposed in the other of said openings, and a third portion which extends through the interior of said single hollow tube through said support element, thereby forming a moldable tube assembly in which at least a portion of the interior of said hollow tube contains only said internal support element and the third portion of said plug;
   e. placing said moldable tube assembly into a mold; and then
   f. heating said mold such that said first and second portions of said plugs fuse to said openings, and wherein said plug forms hollow port which extends through said single hollow tube between said openings.

2. The method of claim 1, wherein said internal support element comprises an inflatable bladder system which runs the length of the tube, wherein a portion of said bladder system is located between said opposed openings, wherein at least the portion of said bladder system which is located between said openings comprises a pair of bladders having facing surfaces, wherein said second portion of said hollow, tubular plug extends between said facing surfaces of said bladders, and wherein said mold is a closable mold; and further comprising the steps, after placing said moldable tube assembly into the mold, of closing the mold and inflating said bladders while heating said mold so that said single hollow tube assumes the shape of the mold.

3. The method of claim 2, wherein said hollow, tubular plug is composed of an uncured composite material, further comprising the step, prior to closing the mold, of inserting a mold element into said hollow tubular plug, said mold element defining the geometry of the hole formed by the port.

4. The method of claim 3, further comprising the steps of:
   a. removing said structure from the mold;
   b. removing said bladders; and
   c. removing said mold element.

5. The method of claim 1 wherein said composite material is a fiber reinforced resin.

6. The method of claim 5 wherein said fibers are selected from a group consisting of carbon, fiberglass, aramid, liquid crystal polymer, hemp, and boron.

7. The method of claim 5 wherein said resin is selected from a group consisting of epoxy, polyester, vinyl ester, nylon, polyamide resins, ABS and PBT.

8. The method of claim 1 wherein said ports are ovoid in shape, forming an opposed arch structure.

9. The method of claim 1 wherein said opposed openings are formed by punching.

10. The method of claim 1 wherein said opposed openings are formed by separating fibers in said composite material.

11. The method of claim 1 further comprising the step of joining one or both ends of said hollow tube to one or more pre-formed portions.

12. The method of claim 11 further comprising the step of applying an overlap joint of a composite material between said hollow tube and said one or more pre-formed portions.

13. The method of claim 2, wherein said single, hollow tube includes a plurality of pairs of opposed openings including a pair of opposed openings having longitudinal axes aligned in a first direction and a pair of opposed openings having longitudinal axes aligned in a second direction orthogonal to said first direction, further comprising the step, prior to molding, of inserting a second pair of inflatable bladders such that the interface between all four bladders forms a cross shape.

14. The method of claim 1 wherein said structure, after curing, has a cross-sectional shape selected from a group consisting of round, ovoid, polygonal and teardrop-shaped.

15. The method of claim 1 wherein said structure, after molding, defines ridges on the external surface thereof, said ridges being disposed longitudinally or circumferentially.

16. The method of claim 1 wherein said hollow tubular plugs are composed of a material selected from a group comprising plastic and metal.

* * * * *